(No Model.) 3 Sheets—Sheet 2.
P. BERNARD.
HAY STACKER.
No. 455,936. Patented July 14, 1891.
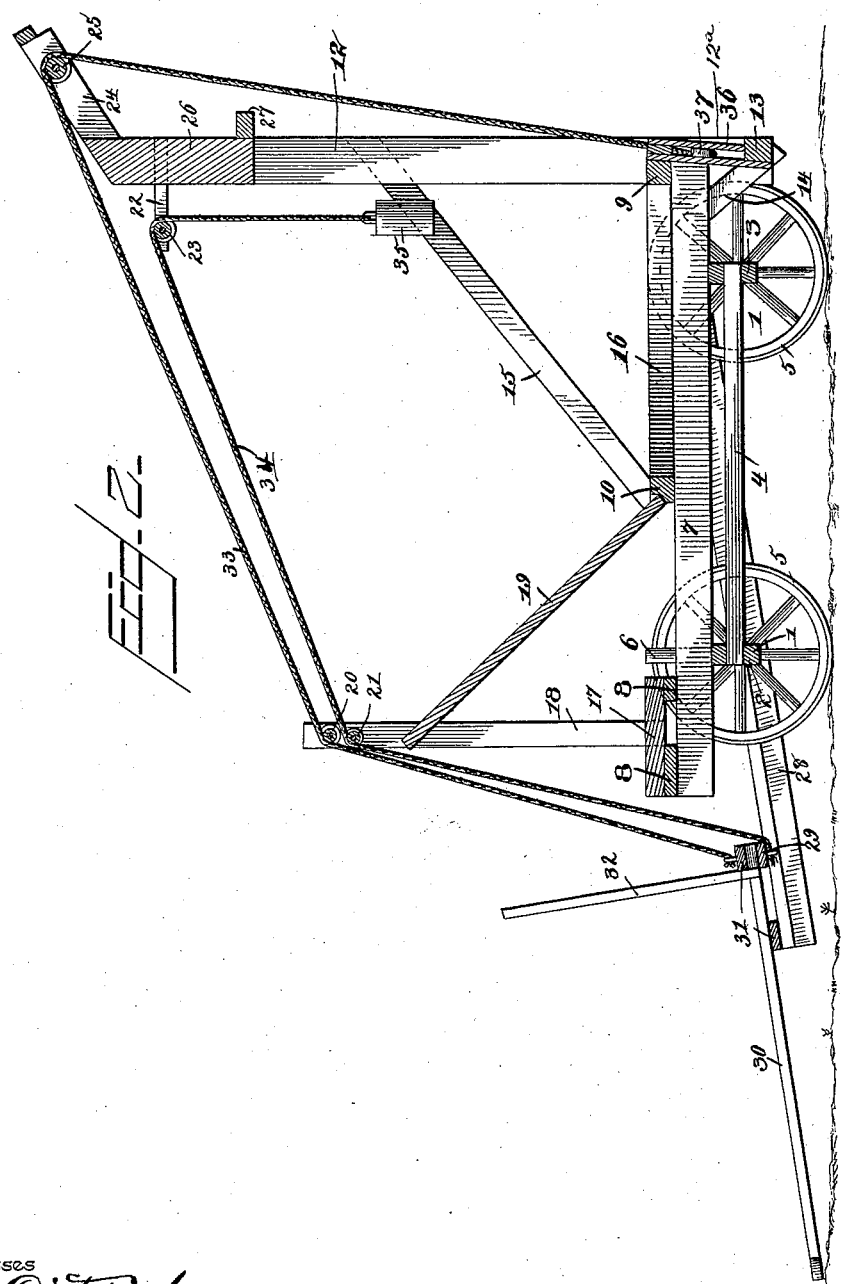
Witnesses
H. G. Dieterich
Wm. Ragger
Inventor
Philip Bernard,
By his Attorneys,
C. A. Snow & Co.

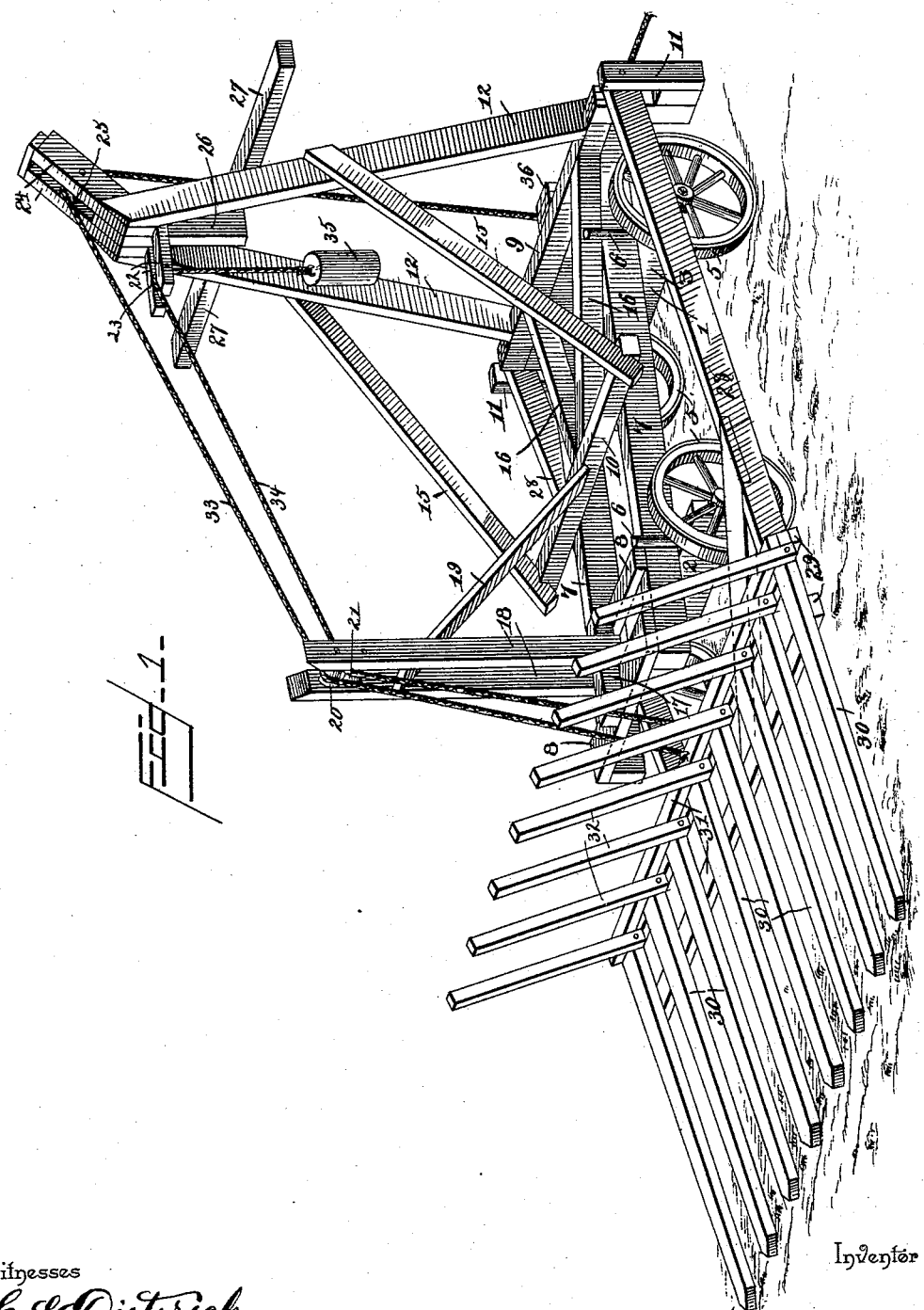

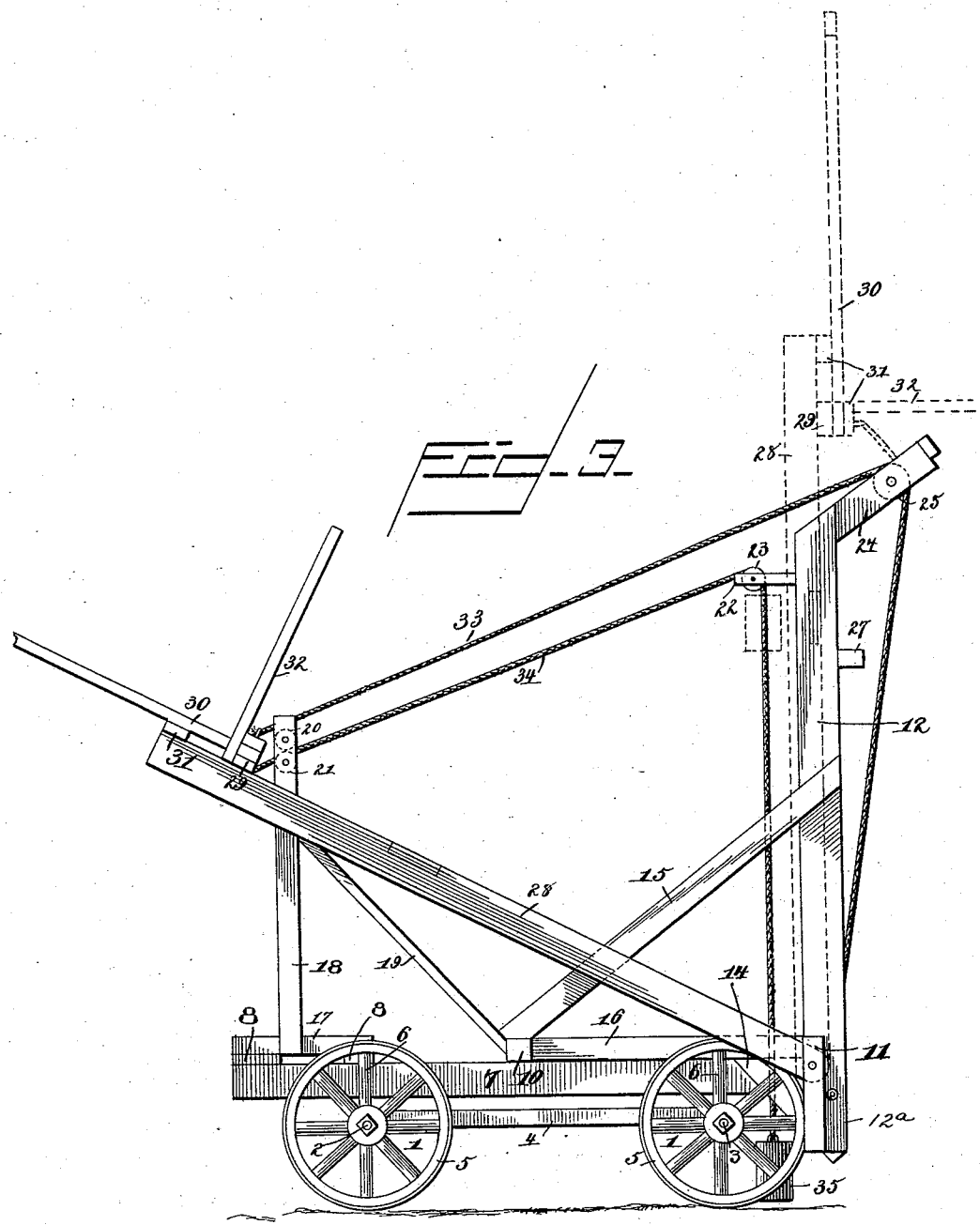

UNITED STATES PATENT OFFICE.

PHILIP BERNARD, OF SIOUX CITY, IOWA.

HAY-STACKER.

SPECIFICATION forming part of Letters Patent No. 455,936, dated July 14, 1891.

Application filed January 31, 1891. Serial No. 379,826. (No model.)

*To all whom it may concern:*

Be it known that I, PHILIP BERNARD, a citizen of the United States, residing at Sioux City, in the county of Woodbury and State of Iowa, have invented a new and useful Hay-Stacker, of which the following is a specification.

This invention relates to hay-stackers; and it has for its object to provide a machine of this class which shall be simple in construction, durable, and efficient in operation, and which shall be adapted to be mounted upon the running-gear of an ordinary farm-wagon to enable it to be transported from place to place and to support it during operation.

The invention consists in the improved construction, arrangement, and combination of parts, which will be hereinafter fully described, and particularly pointed out in the claim.

In the drawings hereto annexed, Figure 1 is a perspective view of a hay-stacker constructed in accordance with my invention. Fig. 2 is a longitudinal sectional view of the same. Fig. 3 is a side elevation showing the load partially raised and with dotted lines showing the load in the act of being discharged.

Like numerals of reference indicate like parts in all the figures.

1 designates an ordinary wagon running-gear, which is composed of the front and rear axles 2 and 3, connected by a reach 4 and supported upon the wheels 5. The axles have the upwardly-extending stakes or brackets 6. The base-frame of my improved hay-stacker is composed of the bottom sills 7 7, which are longitudinally disposed, and which are connected at their front ends by cross-pieces 8 8 and at their rear ends by a cross-piece 9 and by an intermediate or centrally-located cross-piece 10. The ends of the cross-pieces 9 and 10 are extended beyond the side pieces or sills 7, as will be clearly seen in the drawings, and to the projecting ends of the rear cross-piece 9 are attached the upwardly-converging uprights or frame-pieces 12, the extreme lower ends of which (best shown in Fig. 2 at 12ª) are connected by a cross-piece 13, which is connected with the ends of the sills 7 by means of braces 14. The uprights 12 are connected by inclined braces 15 with the ends of the cross-piece 10. The center of the latter is also connected with the rear cross-piece 9 by means of divergent braces 16.

The cross-pieces 8 8 are connected by a central longitudinal brace 17, from which rise a pair of uprights 18, which are connected with the cross-piece 10 by means of a central inclined brace 19. Between the uprights 18, near their upper ends, are journaled a pair of grooved pulleys 20 and 21.

The upwardly-converging uprights 12 are provided at their upper ends with forwardly-extending arms 22, between which is mounted a pulley 23, and with upwardly-extending arms 24, between which is mounted a pulley 25. The arms 24 are inclined somewhat in a rearward direction to bring the pulley 25 beyond the vertical plane of the uprights 12. A spacing block 26 is interposed between the arms 22 22 and 25 25 and is extended downwardly, as shown, and to the said spacing-block and to the rear sides of the uprights 12 is secured a cross-bar 27.

The cross-bar 9 is provided at its ends with depending brackets 11, to which are pivoted the forwardly-extending arms 28, the front ends of which carry the stacking-platform 29, which is composed of teeth or tines 30, suitably secured to cross-bars 31, and auxiliary teeth or tines 32, suitably secured to the rear ends of the teeth 30. The hoisting-rope 33, attached to the latter, passes over the guide-pulley 21 at the upper ends of the uprights 18, and from thence over the pulley 25 at the upper ends of the upwardly and rearwardly inclined arms 24, secured to the uprights 12. A rope 34, which is also attached to the stacking-platform, passes between the pulleys 20 and 21 and over the pulley 23 at the front ends of the arms 22, secured to the uprights 12. To the end of the rope 34 is attached a weight 35. The rear cross-piece 9 is connected with the brace 13 by means of vertical brace-rods 36, between which is journaled a pulley 37, under which the hoisting-rope is carried after passing over the guide-pulley 25.

From the foregoing description, taken in connection with the drawings hereto annexed, the operation and advantages of my invention will be readily understood by those skilled in the art to which it appertains. The load which is elevated is deposited in the usual manner upon the stacking-platform while the latter is in a lowered position. Draft is then applied to the hoisting-rope. When the stacking-platform is in its initial or lowered position, the weight 35 is elevated, as will be seen in Fig. 1. When draft is applied to the hoisting-rope and the stacking-platform begins to rise, the weight 35 descends, thus assisting the stacking-platform in rising at the point where the resistance to be overcome is greatest. When the stacking-platform is about half-way elevated, the weight 35 reaches the lowest point and remains stationary, while the rope 34 passes from the pulley 20 into engagement with the pulley 21. The weight 35 now begins again to ascend and continues the upward motion until the discharge of the load, which takes place when the arms 29 strike the ends of the cross-bar 27 upon the rear sides of the uprights 12. After the load has been dumped the weight 35 serves to start the stacking-platform in a downward direction until the weight reaches the lowest point, when the rope 34 passes into engagement with the pulley 20, and the weight being now started in an upward direction serves to retard the downward movement of the stacker and to prevent any violent shock to the machinery when it reaches its lowered position.

My improved hay-stacker is exceedingly simple in construction, and may be readily transported from place to place upon the running-gear of an ordinary wagon. The load may be deposited upon the platform by means of a rake or gatherer of ordinary well-known construction.

I have in the foregoing described what I consider to be the preferred construction of my improved hay-stacker; but I desire it to be understood that I reserve the right to any changes and modifications which may be resorted to without departing from the spirit of my invention.

Having thus described my invention, I claim and desire to secure by Letters Patent of the United States—

A hay-stacker comprising the base-frame consisting of the longitudinal parallel sills 7 7, the cross-pieces 8, 8 9, and 10, connecting the same, the upwardly-converging uprights 12, the longitudinal brace 17, the uprights 18, the inclined braces 15 and 19, the diverging braces 16, the pulleys 20 and 21 near the upper ends of the uprights 18, the pulleys 23 and 25, mounted, respectively, between arms 22 22 and 24 24 at the upper ends of the uprights 12, the pivoted arms 28, having the stacking-platform 29, the hoisting-rope secured to the latter and passing over the pulleys 21 and 25 and under a guide-pulley at the rear end of the stacking-platform, and a rope secured to the platform, passing between the pulleys 20 and 21 and over the pulley 23, and carrying a weight 35, all arranged and operating substantially as and for the purpose herein shown and specified.

In testimony that I claim the foregoing as my own I have hereto affixed my signature in presence of two witnesses.

PHILIP BERNARD.

Witnesses:
M. S. BUFFINGTON,
WILBRA COLEMAN.